United States Patent [19]

Smith

[11] Patent Number: 4,788,483

[45] Date of Patent: Nov. 29, 1988

[54] PARALLEL REDUNDANT ACTUATOR SYSTEMS

[76] Inventor: Richard B. Smith, Pinehurst, Queens Avenue, Maidstone, Kent, England

[21] Appl. No.: 62,125

[22] Filed: Jun. 12, 1987

[30] Foreign Application Priority Data

Jun. 20, 1986 [GB] United Kingdom ............... 8615145

[51] Int. Cl.⁴ .............................................. G05B 17/00
[52] U.S. Cl. .................................... 318/689; 318/254; 318/138; 318/671
[58] Field of Search ............... 318/689, 671, 254, 138

[56] References Cited

U.S. PATENT DOCUMENTS 4,159,444  6/1979  Bartlett et al. ....................... 318/564
4,642,539  2/1987  Hinds .................................. 318/439

FOREIGN PATENT DOCUMENTS 926471   5/1963  United Kingdom .
961259   6/1964  United Kingdom .
1249982 10/1971  United Kingdom .
1372376 10/1974  United Kingdom .
2017343 10/1979  United Kingdom .
2149939  6/1985  United Kingdom .

Primary Examiner—William M. Shoop, Jr.
Assistant Examiner—Saul M. Bergmann
Attorney, Agent, or Firm—Kirschstein, Kirschstein, Ottinger & Israel

[57] ABSTRACT

A parallel redundant actuator system of the kind wherein the signal in each of a plurality of lanes (31A, 31B, 31C) comprises the difference between a demand signal and a signal indicating the position of an output member of the system and the output member (3) takes up a position determined by the output of a summing arrangement (21) for the outputs of the lanes and wherein between the input of each lane and the output of the summing arrangement each lane has a non-linear input/output characteristic whose slope over a range of values of input in which changes of input due to failure of another lane occur is greater than if the characteristic were linear over the range of values of input over which the lane is capable of operation. The arrangement is intended to reduce the change in position of the output member which occurs on failure of a lane.

10 Claims, 2 Drawing Sheets

# PARALLEL REDUNDANT ACTUATOR SYSTEMS

BACKGROUND OF THE INVENTION

1. Field of the Invention

This invention relates to parallel redundant actuator systems.

2. Description of Related Art

In a parallel redundant actuator system a plurality of demand signals each indicating the desired position of an output member of the system are respectively applied to a plurality of nominally identical signal lanes whose outputs together control the position of the output member. Such a system has the advantage that, on failure of a component in one or more, but not all, of the signal lanes, the system continues to operate.

In a known form of such a system, a signal representing the actual position of the output member is fed back to the input end of each lane where it is compared with a lane demand signal, and the error signal is fed via the lane to a summing arrangement to produce an output representative of the sum of the lane output signals which is utilised to control the position of the actuator system output member.

In one particular such arrangement, the summing arrangement comprises a torque motor having a plurality of control windings to which the lane output signals are respectively applied and the motor operates a valve which controls the supply and discharge of pressurised hydraulic fluid to and from a hydraulic actuator whose output member constitutes the output member of the system.

In operation of such a system, if a failure occurs in a lane such that the signal applied by that lane to the summing arrangement no longer relates to the demand signal applied to that lane, the signals applied to the summing arrangement by the other healthy lanes change by an amount such as to compensate for the incorrect signal produced by the failed lane. However, since the output signals of the healthy lanes for a given demand signal are required to change when failure occurs in a lane, there will inevitably be a small change in the position of the actuator output member when a lane failure occurs, the magnitude of this change in position being dependent on the magnitude of the change in the output signals of the healthy lanes required to compensate for the failed lane. This problem is exacerbated where, as is commonly the case, each lane includes a further feedback loop, inside the actuator output member position feedback loop, to improve dynamic response of the actuator system.

SUMMARY OF THE INVENTION

It is an object of the present invention to provide a parallel redundant actuator system wherein this problem is alleviated.

According to the present invention in a parallel redundant actuator system of the kind comprising: a plurality of signal lanes each responsive to the difference between a respective demand signal representing a desired position of an output member of the system and a feedback signal representing the actual position of said output member; a summing arrangement responsive to the outputs of said signal lanes to produce an output signal representative of the sum of the outputs of said lanes; and an actuator responsive to the output of said summing arrangement to control the position of said output member; between the input of each said lane and the output of the summing arrangement the system exhibits a non-linear input/output characteristic whose slope over a range of values of input in which changes of input due to failure of another lane occur is greater than if the characteristic were linear over the range of values of input over which the lane is capable of operation.

In one particular embodiment of the invention said input/output characteristic has a slope which decreases with increase of input.

Where each lane includes a further feedback loop inside the output member position feedback loop, said input/output characteristic is preferably conferred by a component within the further feedback loop.

Said input/output characteristic is suitably conferred by the summing arrangement. In such an arrangement the summing arrangement is suitably constituted by a torque motor.

BRIEF DESCRIPTION OF THE DRAWINGS

One parallel redundant actuator system in accordance with the invention will now be described, by way of example, with reference to the accompanying drawings in which.

DETAILED DESCRIPTION OF THE PREFERRED EMBODIMENTS

Figure 1:
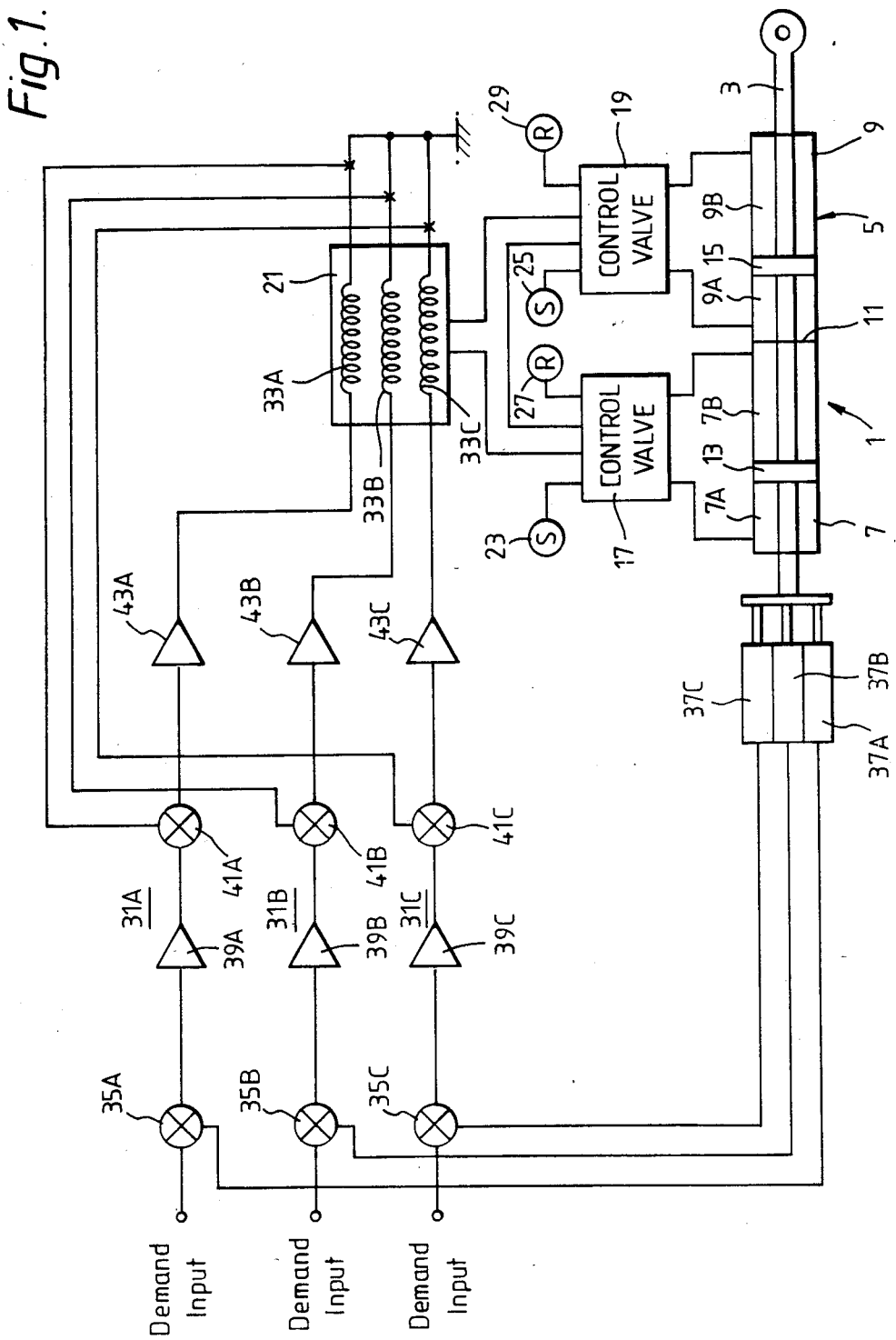
FIG. 1 is a schematic diagram of the system.

Referring to FIG. 1 of the drawings, the system includes a hydraulic ram actuator 1 whose output member is in the form of a rod 3. In operation the system controls axial movement of the rod 3, the end of the rod being attached to a device (not shown) whose movement is to be controlled by the system, e.g. a flight control surface of an aircraft.

The rod 3 is mounted for axial movement in a hollow cylindrical enclosure 5 which is divided into two compartments 7 and 9 by an internal wall 11. At spaced positions along the rod there are two pistons 13 and 15, one piston 13 dividing the compartment 7 into two chambers 7A and 7B and the other piston 15 dividing the compartment 9 into two chambers 9A and 9B.

Each of the compartments 7 and 9 is associated with a respective control valve 17 or 19, the two valves being operated in unison by a dc brushless torque motor 21.

In operation, the valves 17 and 19 are controlled by the motor 21 so as either to admit pressurised hydraulic fluid from respective supply lines 23 and 25 to the chambers 7A and 9A respectively and to discharge fluid from chambers 7B and 9B respectively to respective return lines 27 and 29, thereby driving the rod 3 to the right as shown in the Figure, or to admit fluid from supply lines 23 and 25 to chambers 7B and 9B and discharge fluid from chambers 7A and 9A to return lines 27 and 29 to drive the rod 3 to the left as shown in the Figure.

It will be appreciated that the valves 17 and 19 will incorporate bypass valves to prevent seizure due to hydraulic lock in known manner.

Current signals for control of the torque motor 21, and hence the valves 17 and 19, are supplied in parallel on three signal lanes 31A, 31B and 31C. Each such lane output signal is supplied to a respective control winding 33A, B or C on the stator of the motor 21, each winding being located on a separate pole piece of the stator, and the windings being isolated from one another to prevent common mode failures. The torque motor 21 is arranged to produce an output torque which is the linear arithmetic sum of the torques represented by the signals applied to the windings 33A, B and C.

Each signal lane includes a first summing point 35A, B or C wherein a demand signal representing the desired position of the output member 3 of the system is differenced with a signal representing the actual position of the member 3, derived from a respective one of three position detectors 37A, B and C, to produce an error signal.

The error signal is passed via a first amplifier 39A, B or C to a second summing point 41A, B or C. In the second summing point the output signal of the amplifier 39A, B or C is differenced with a signal representing the current in the corresponding control winding 33A, B or C of the motor 21. The resulting error signal is then applied to the corresponding winding 33A, B or C via a second amplifier 43A, B or C. The second feedback loop thus provided improves dynamic response of the system in accordance with known servo practice but also has the effect that the output of the amplifier 43A, B or C in a lane tends to go hardover if the feedback loop is broken or earthed.

In normal operation, each lane 31A, B or C supplies to the motor 21 a signal substantially corresponding to one third of the torque required to be supplied by the motor 21 to operate the rod 3 to the position required by the demand signals.

When one lane fails, say lane 31A, the torques supplied by each of the remaining two healthy lanes 31B and C will change by an amount sufficient to compensate for the change in the torque supplied by the failed lane 31A. In order for the healthy lanes 31B, C to do this there is necessarily a small offset in the position of the rod 3 from its position before the lane 31A failed.

In accordance with the invention, in order to minimise this offset, the relation between the current input signal supplied to each winding 33A, B or C of the motor 21, and the resulting torque at the motor output, is arranged to be non-linear. More particularly, this input/output characteristic is arranged to have a slope which decreases with increasing input. As a result, the required change of torque supplied by the healthy lanes 31B and C is achieved with a smaller change in the output signals of the summing points 35B and C of the healthy lanes 31B and C, and hence with a smaller offset in the position of the rod 3, than would be the case if the above-mentioned input/output characteristics were linear over the required range of torque.

It is pointed out in this connection that the maximum torque capability of each lane 31 is required to be well in excess of the maximum total torque required to be applied to the control valves 17, 19 in operation, in order that breakout from a stuck control valve condition can be achieved. Consequently the changes in torque of the healthy lanes 31B and C which take place to compensate for a lane failure occur in the lower part of the above-mentioned input/output chacacteristics where the characteristic will be of greater slope than a comparable linear characteristic.

In one particular embodiment of the system shown in the drawing the torque sum equation of the motor 21 is:

$$T = \sum_{n=1}^{3} \frac{K \cdot In}{1 + X\left(\frac{In}{Im}\right)^Y} \quad (1)$$

where

T is the total output torque of the motor 21

Im is the maximum value of the input current to each lane;

In is the input current to lane n;

K is the torque to current gain factor of each lane; and

X and Y are constants.

X and Y suitably have values of 1.5 and 1.6 respectively.

Figure 2:
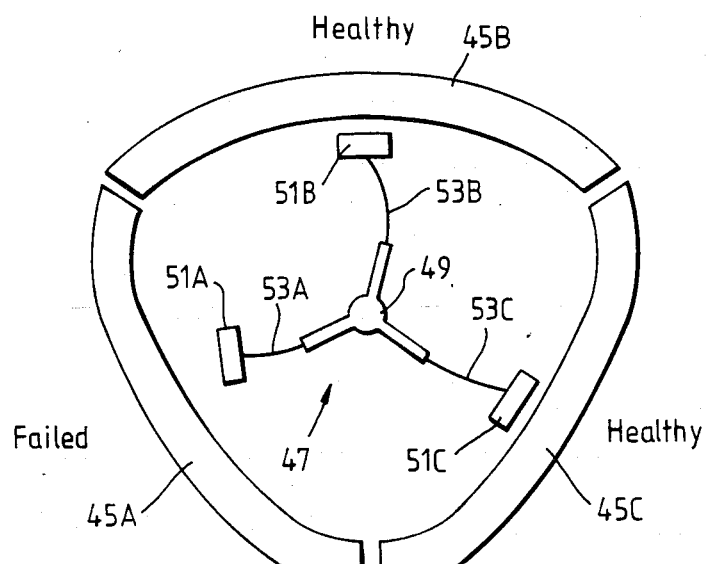
FIG. 2 illustrates one possible form of a torque motor included in the system.

The equation (1) is suitably implemented using a non-linear torque motor 21 of the form shown in FIG. 2.

The motor has three pole pieces 45A, 45B and 45C each of which is energised by a respective one of the windings 33A, 33B and 33C (not shown in FIG. 2). The pole pieces 45A, 45B, 45C define a central space of generally ogival cross-section and centrally within the space there is a rotor assembly 47 comprising a shaft 49 and three permanent magnet assemblies 51A, 51B and 51C respectively connected to the shaft 49 at equal radial distances therefrom by spring elements 53A, 53B and 53C at positions equally spaced around the shaft 49.

In normal operation the magnet assemblies 51A, 51B and 51C are deflected to take up positions symmetrical with respect to the pole pieces 45A, 45B, 45C respectively.

In the event of failure of a lane, current drive from the failed lane typically assumes a maximum value and the associated magnet assembly, say 51A, is deflected in a direction of increasing air gap width, as illustrated in FIG. 2. The resulting deflection of the permanent magnet assembly 51A is then compensated by deflection of the magnet assemblies 51B and 51C of each of the healthy lanes in a direction of diminishing air gap width, the latter deflections being determined by torque balance between the magnets.

As the positions of the permanent magnet assemblies 51B and 51C of the healthy lanes are close to the minimum air gap positions of their respective pole pieces 45B and 45C the angular displacements needed by their respective servo loops to generate sufficient opposing torque is much smaller than if the system were not to employ or be in accordance with the aforementioned non-linear relationship.

Whilst the equation (1) provides satisfactory operation it has the limitation that the gain in each lane is set by its own operating point.

In an alternative embodiment a more comprehensive function which includes a weighting factor based on the torque differential between each lane and the total output torque T is used, as follows:

$$T = \sum_{n=1}^{3} \frac{K \cdot In}{1 + X\left|\frac{Tn - T}{T\max}\right|^Y} \quad (2)$$

where

T max is the maximum torque capability of each lane; and

Tn is the torque provided by lane n.

X and Y suitably have values of 3 and 1.4 respectively.

Figure 3:
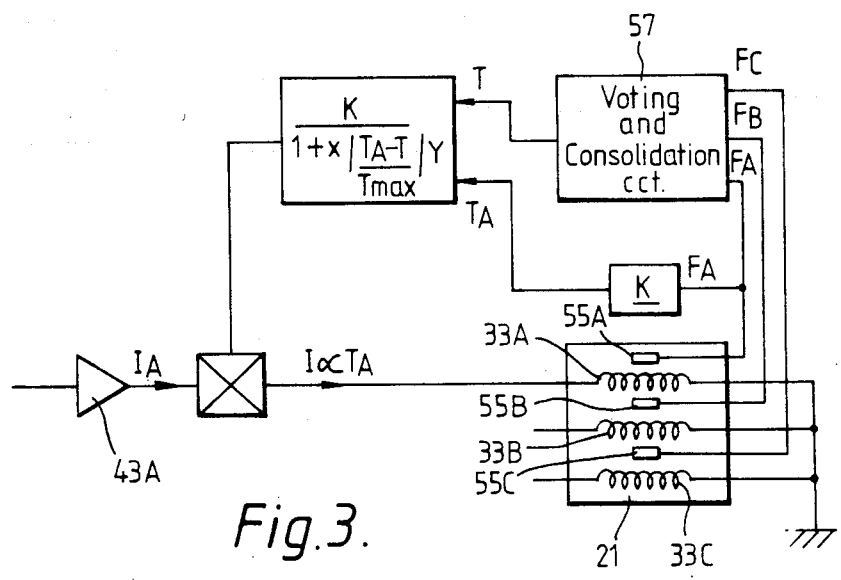
FIG. 3 illustrates another possible form of the torque motor.

The equation (2) is suitably implemented using a motor 21 of the form illustrated in FIG. 3.

In this arrangement the motor 21 has a control winding/rotor arrangement which has an approximately linear torque output for the current applied to each winding 33A, 33B or 33C. Each winding 33A, 33B, 33C is associated with a respective flux measurement device 55A, 55B or 55C, e.g. a Hall effect device. The outputs FA, FB and FC of the devices 55A, 55B and 55C are fed to a voting and consolidation circuit 57 which gives an output having a value representative of the total output torque T of the motor 21. As illustrated in FIG. 3 for lane 31A only, this value T is then used together with the value of the flux FA, FB or FC for the appropriate lane to compute, in accordance with equation (2) above, the value of the current I to be applied to each of the control winding 33A, 33B and 33C of the motor 21 at the current gain factor K.

A significant advantage of the equation (2) is its ability to reduce the gain of lanes with null failures. It will however be understood that this second function is relatively complex to implement.

It will be appreciated that whilst in the arrangement described by way of example the required non-linear characteristic in each lane 31 is conferred by the torque motor 21, this is not necessarily the case. Thus in other systems in accordance with the invention the non-linear characteristic in the lanes may be conferred by a component anywhere in the lanes. However, where the lanes include more than one feedback loop the non-linear characteristic should be conferred by a component which is within each feedback loop. Thus the use of the torque motor or other summing arrangement to confer the required non-linear lane characteristics is generally most convenient, and moreover, the summing arrangement will normally be a component of higher reliability than other components of the lanes.

It will be further understood that the invention is applicable to parallel redundant actuator systems having other than three lanes, in particular four lane systems.

I claim:

1. A parallel redundant actuator system comprising: an output member; a plurality of signal lanes each having an input, an output and a position feedback loop; means for applying to the input of each said lane a respective demand signal representing a desired position of said output member and a feedback signal produced by said position feedback loop representing the actual position of said output member, to produce at the output of that lane a signal representative of the difference between said demand and feedback signals; a summing arrangement having a plurality of inputs which are respectively connected to the outputs of said signal lanes to produce at an output of said summing arrangement an output signal representative of the sum of said output signals of said lanes; and an actuator connected between said summing arrangement and said output member and responsive to said output signal of said summing arrangement to control the position of said output member; said actuator system exhibiting a non-linear functional relationship between the input signal of each lane and the output signal of said summing arrangement over a range of values of input signal for which the lane is capable of operation whose slope over a range of values of input signals for which changes occur due to failure of another lane is greater than if said relationship were linear over said range of values of input signal for which the lane is capable of operation.

2. A system according to claim 1, wherein said non-linear functional relationship has a slope which decreases with increase of input signal over said range of values of input signal for which the lane is capable of operation.

3. A system according to claim 1, wherein each lane includes a further feedback loop inside said position feedback loop, the non-linearity of said non-linear functional relationship being conferred by a component within said further feedback loop.

4. A system according to claim 1, wherein the non-linearity of said non-linear functional relationship is conferred by said summing arrangement.

5. A system according to claim 4 wherein said summing arrangement is a torque motor.

6. A system according to claim 5 wherein said actuator is a hydraulic actuator and said torque motor controls a valve arrangement for controlling the supply of hydraulic fluid to and from said actuator.

7. A system according to claim 5 wherein said torque motor exhibits a torque sum equation of the form $$T = \sum_{n=1}^{N} \frac{K \cdot In}{1 + X\left(\frac{In}{Im}\right)^Y}$$

where
T is the total output torque of the motor;
Im is the maximum value of the input current to each lane;
In is the input current to lane n;
K is the torque to current gain factor of each lane;
N is the number of lanes; and
X and Y are constants.

8. A system according to claim 7 wherein X has the value of 1.5 and Y has the value 1.6.

9. A system according to claim 5 wherein said torque motor exhibits a torque sum equation of the form $$T = \sum_{n=1}^{N} \frac{K \cdot In}{1 + X\left|\frac{Tn-T}{Tmax}\right|^Y}$$

where
T is the total output torque of the motor;
T max is the maximum torque capability of each lane;
Tn is the torque provided by lane n;
Im is the maximum value of the input current to each lane;
In is the input current to lane n;
K is the torque to current gain factor of each lane;
N is the number of lanes; and
X and Y are constants.

10. A system according to claim 9 wherein X has the value of 3 and Y has the value 1.4.

* * * * *